United States Patent
Tada

Patent Number: 5,314,311
Date of Patent: May 24, 1994

[54] THRUST GENERATOR

[75] Inventor: Eiichi Tada, Izumi, Japan

[73] Assignees: Koatsu Gas Kogyo Co., Ltd.; Masaaki Muroya, both of Ohsaka; Masao Hiroi, Shiga, all of Japan; part interest to each

[21] Appl. No.: 752,552
[22] PCT Filed: Nov. 10, 1989
[86] PCT No.: PCT/JP89/01153
§ 371 Date: Sep. 10, 1991
§ 102(e) Date: Sep. 10, 1991
[87] PCT Pub. No.: WO91/07806
PCT Pub. Date: May 30, 1991

[51] Int. Cl.⁵ .......................................... H02K 44/08
[52] U.S. Cl. ........................................ 417/50; 60/203.1
[58] Field of Search .............. 417/50; 60/202, 203.1, 60/221; 440/6

[56] References Cited

U.S. PATENT DOCUMENTS

| | | | |
|---|---|---|---|
| 2,997,013 | 8/1961 | Rice | 60/35.5 |
| 3,372,644 | 3/1968 | Nilson | 103/1 |
| 4,177,015 | 12/1979 | Davidson | 417/50 |
| 4,527,955 | 7/1985 | Duncombe et al. | 417/50 |
| 4,767,364 | 8/1988 | Lenz | 440/38 |
| 4,782,671 | 11/1988 | Breneman et al. | 62/514 |
| 4,790,147 | 12/1988 | Kuriyama et al. | 62/514 R |
| 5,087,215 | 2/1992 | Simuni | 440/6 |
| 5,117,141 | 5/1992 | Hawsey et al. | 310/114 |

FOREIGN PATENT DOCUMENTS

| | | |
|---|---|---|
| 3916882 | 11/1990 | Fed. Rep. of Germany . |
| 3248995 | 11/1991 | Japan . |

OTHER PUBLICATIONS

"Supercon goes to sea", Popular Science, pp. 80–85, Nov. 1992.
"Yoshiro Saji and his magnetic ship", Discover, pp. 42–44, 48, Apr. 1985.

*Primary Examiner*—Richard A. Bertsch
*Assistant Examiner*—Alfred Basichas
*Attorney, Agent, or Firm*—Burns, Doane, Swecker & Mathis

[57] ABSTRACT

A ship has an electromagnetic thrust generator including a cylindrical magnet in which there is arranged a helical duct for conducting sea water. The magnet includes a coil housing in which a superconducting coil is disposed. The duct includes an outer wall disposed opposite the internal surface of the coil housing. Electrode members are mounted on inner and outer walls of the duct to create an electrical field across the duct.

3 Claims, 4 Drawing Sheets

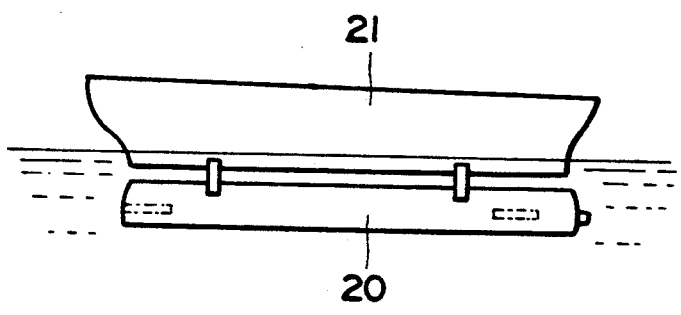
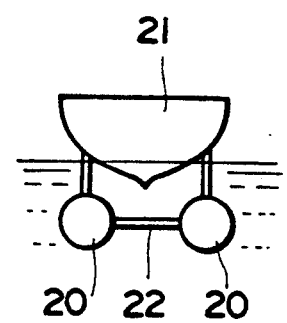
Fig. 3
Fig. 4
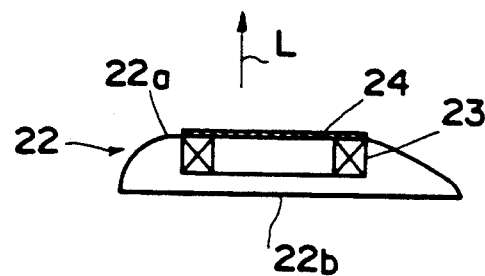
Fig. 5
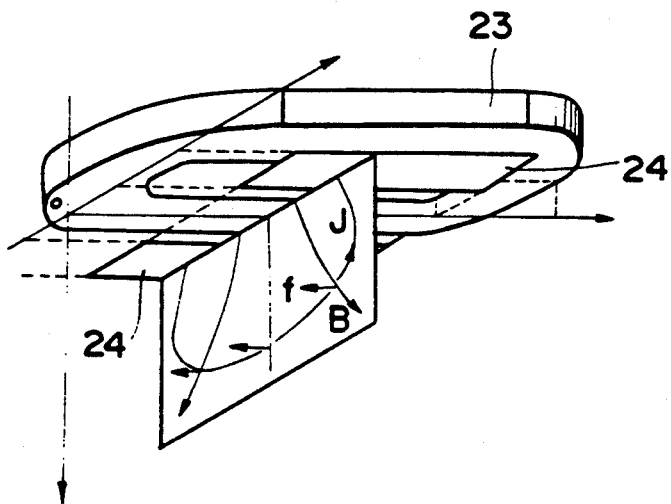
Fig. 6

THRUST GENERATOR

TECHNICAL FIELD

The present invention relates to a thrust generator which is suitable for a superconducting Electro Magnetic Thruster (hereinafter referred as EMT) of ship propulsion devices, a Dynamic Positioning Systems for ocean platforms and an Electro-Magnetic pumps acting upon an electrically conductive fluid, for example, sea water and a MHD generator and pumps and generators of pumping-up power systems.

BACKGROUND OF THE INVENTION

It is known to use dipole, quadralpol, saddle and racetrack type superconducting magnets for EMTs. The conventional EMTs may however be too big and too heavy to gain enough thrust for full-scale ships because of a low magnetic field of such magnets and it being difficult to construct the magnets. The magnetic field must be so strong, e.g., 10 to 20 Teslas, to obtain enough propulsive efficiency for EMT ships. The EMT having such a strong magnetic field may be a huge one while an on-board EMT propulsion device is limited in size and weight because of restricted hull space. Now, EMT propulsion units are unsatisfactory with respect to size, weight, thrust force and high magnetic field. In view of this, there is an important technological desire to develop EMTs for practical use.

DISCLOSURE OF INVENTION

The present invention is intended to provide light weight and compact thrust generators having high thrust and high magnetic field superconducting magnets. According to the present invention, the superconducting EMT generator comprises a super conducting solenoid magnet and a helical thrust duct with a pair of electrodes inserted in the hollow interior of the superconducting solenoid magnet. The inlet and the outlet of the spiral duct are spaced axially apart with respect to the longitudinal center axis of the solenoid magnet. In the case of sea water as a conductive fluid flowing in the thrust duct, an anode or a positive electrode is arranged continuously on the inner side wall of the duct, and a cathode or a negative electrode is disposed on the outer side wall of the duct because of a decreasing effective electrochemical reaction area of electrode by producing hydrogen bubbles at the cathode.

It is possible to generate the maximum thrust in case of a ratio of 3.5 of outer radius to inner radius of the duct.

The thrust duct with rectangular cross section is suitable for avoiding waste of the thrust volume.

A pair of superconducting solenoid magnets can be arranged in a row. Also, magnets arranged in parallel can form a closed loop magnetic flux line, resulting in the magnetic flux density generated by a pair of superconducting magnets being so much stronger than a single superconducting magnet.

The higher magnetic flux density generates a higher thrust and a higher propulsive efficiency.

It is possible that the magnetic field can be perfectly shielded by mounting superconducting material films or coils at the end of EMT units.

BRIEF DESCRIPTION OF DRAWINGS

FIG. 3 shows a general layout illustration of the EMT, shown in FIG. 1, for use as a ship propulsion system.

FIG. 4 shows a front view of FIG. 3.

FIG. 5 shows a cross section of a foil as shown in FIG. 4.

FIG. 6 shows a vector schematic of the Lorentz's forces acting on the foil of FIG. 4.

DESCRIPTION OF THE PREFERRED EMBODIMENTS

Figure 1:
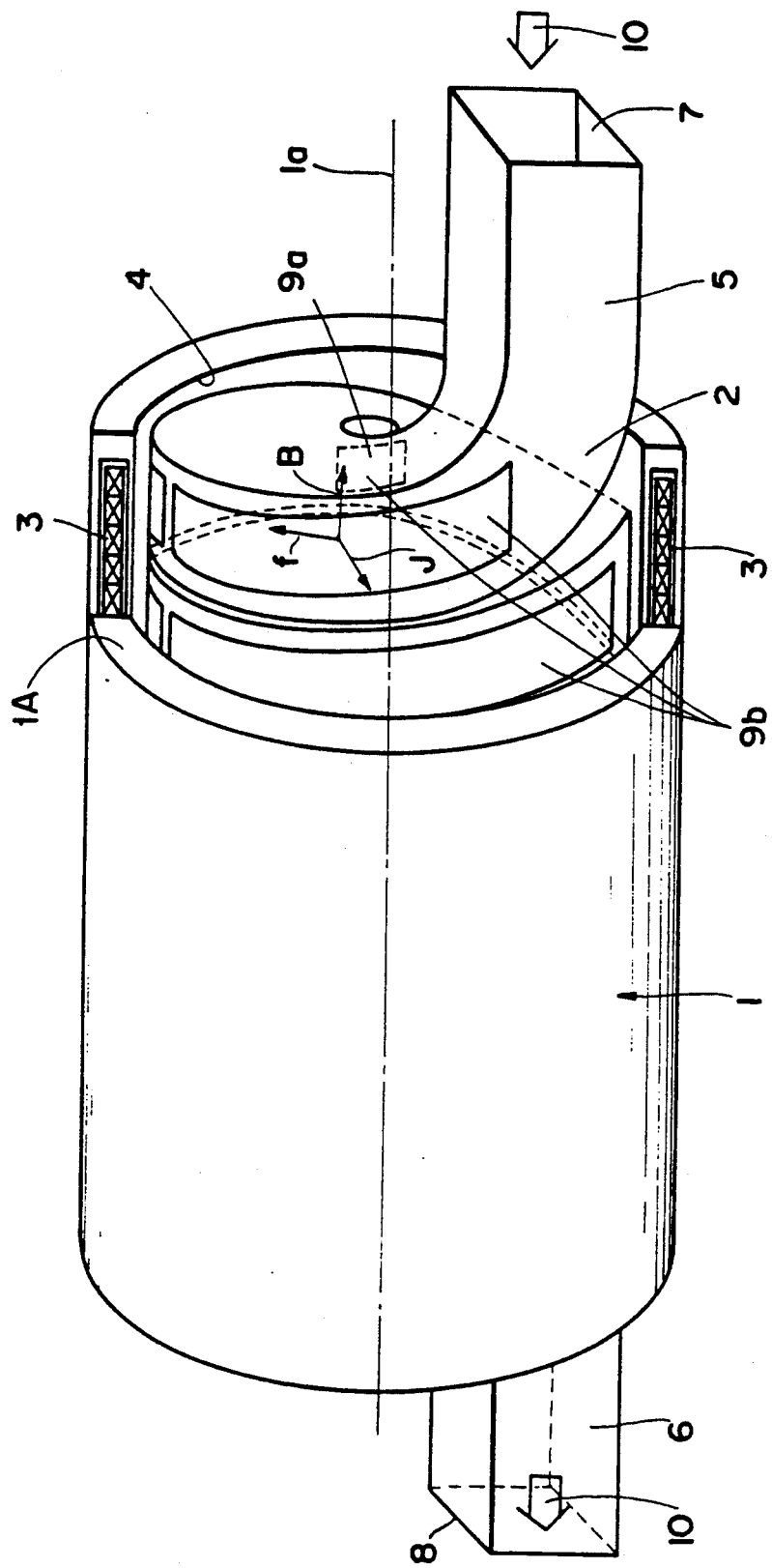
FIG. 1 shows a simplified cut-away perspective view of a device adopting the present invention.
Figure 2:
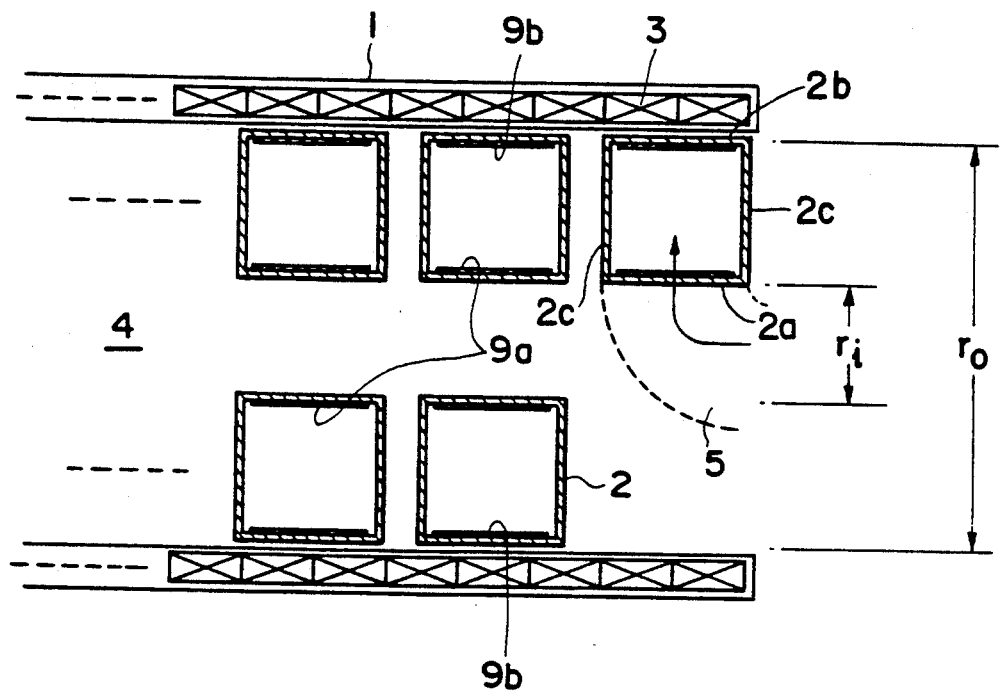
FIG. 2 shows an enlarged detailed longitudinal section taken through a portion of FIG. 1.

Preferred embodiments of the present invention will now be described hereinafter referring to the accompanying drawings. The thrust generator of the present invention provides a superconducting solenoid magnet 1 and a spiral thrust duct 2. The duct 2 includes inner and outer walls 2a, 2b, interconnected by intermediate walls 2c. The superconducting magnet 1 includes a housing 1A containing coils 3 of wound superconducting wires insulated in a highly efficient thermal container of cryostat. The superconducting solenoid magnet generates a strong magnetic field in the hollow interior 4 of the magnet defined by a circular cylindrical inner surface of the housing (the direction of magnetic field being shown by arrow B). The superconducting solenoid magnet 3 is operating in the persistent current mode. The winding concept of superconducting solenoid magnet 3 may be a pancake type or a layered type.

The thrust duct 2 is hollow, has a rectangular cross section, and forms a helix. The helical portion of the thrust duct 2 is inserted in the hollow interior of the superconducting solenoid magnet 1. Both an inlet 5 and an outlet 6 of the duct 2, each having an opening 7, 8, extend longitudinally with respect to the longitudinal center axis 1a of the superconducting solenoid magnet 1. There is however no restriction concerning the cross sectional form of the thrust duct 2 in the present invention.

Electrodes 9a, 9b are fixed at respective side walls of the thrust duct 2. In the illustration of FIG. 1, an anode 9a is arranged on the inner side wall of the thrust duct 2, and a cathode 9b is arranged on the outer side wall of the thrust duct 2 because of a decreasing effective electrochemical reaction area of the cathode 9b caused by hydrogen bubble production during operation. The present invention is not restricted with respect to the arrangements of electrodes.

In FIG. 1, the reaction between the magnetic field B generated by the fixed superconducting magnet 1 in the ship and the electric current J passing through the sea water from anode 9a to cathode 9b generates a Lorentz's force f (each direction is shown by an arrow). Sea water acting as a conductive fluid 10 flows into the helical portion 2 of the thrust duct 2 from the opening 7 of the inlet 5 of the thrust duct 2. In the helical portion 2 of the thrust duct 2, the sea water 10 is pressed by Lorentz's force f. The thrust of the ship is obtained by jetting sea water from the opening 8 of the outlet 6.

Moreover, the maximum thrust is obtained when the ratio between the outer radius ro and the inner radius ri of the thrust duct is, ro≃3.5 ri.

Now, upon introducing the electrode electric current Jso, and the electrode voltage Vso, the input electric power Peo is calculated by the following equations, $$J_{30} = j_c(2\pi r_c \cdot b)n = j_c(2\pi r_c)l$$

$$V_{30} = [(r_c j_c)/\sigma] \cdot \ln(r_e/r_c) \quad (1)$$

$$P_{60} = [j_c^2 \cdot (r_c j_c)/\sigma] \cdot \ln(r_e/r_i)$$

where;
- jc: Electric current density at the reference radius rc (A/m²)
- rc: Reference radius (m²) = (ro + ri)/2
- b: Cell length of the thrust duct 2 (m)
- n: Number of cells of the thrust duct 2
- l: Overall length of the thrust duct 2 (m)
- s: Sea water electric conductivity (S/m)

The Lorentz's force $F_{LO}$ is calculated by, $$\begin{aligned} F_{LO} &= j_c \cdot B \cdot V_E \\ &= j_c \cdot B \cdot (r_e^2 - r_i^2)\pi b n \\ &= j_c \cdot B \cdot (r_e^2 - r_i^2)\pi l \end{aligned} \quad (2)$$

Substituting Equation (1) into Equation (2), $$F_{LO} = \sqrt{\frac{P_{co}}{(r_c^2/\sigma) \cdot 2\pi l \cdot \ln(r_c/r_i)}} \cdot B \cdot (r_o^2 - r_i^2)\pi l$$

Squaring equation, $$\begin{aligned} F_{LO}^2 &= \frac{P_{co} \cdot \sigma}{r_c^2 \cdot 2\pi l \cdot \ln(r_c/r_i)} \cdot B^2 \cdot (r_o^2 - r_i^2)^2 \pi^2 l^2 \\ &= (P_{co} \cdot \sigma \cdot B^2 \pi l/2) \cdot \frac{(r_o^2 - r_i^2)^2}{r_c^2 \cdot \ln(r_c/r_i)} \end{aligned}$$

As a result, $$\begin{aligned} F_{LO}^2 &= A \cdot \frac{(r_o + r_i)^2(r_o - r_i)^2}{[(r_o + r_i)^2/4] \cdot \ln(r_o/r_i)} \\ &= 4A \cdot \frac{(r_o - r_i)^2}{\ln(r_o/r_i)} \end{aligned}$$

where A is defined as follows.

$$A = P_c \sigma B^2 \pi \tfrac{l}{2}$$

The maximum Lorentz' force is obtained when it is satisfied by the following relation.

$$\delta(F_{LO})^2/\delta\, r_i = 0$$

The numerical solutions are shown in TABLE 1 which demonstrates that the maximum Lorentz's force attained when the thrust duct dimension is satisfied by the relation, ro≃3.5 ri.

TABLE 1

| ro (m) | ri (m) | ro/ri | ri/ro |
|---|---|---|---|
| 0.8 | 0.228 | 3.509 | 0.285 |
| 0.7 | 0.2 | 3.5 | 0.286 |
| 1.0 | 0.285 | 3.508 | 0.285 |
| 0.3 | 0.009 | 3.333 | 0.3 |
| 1.2 | 0.34 | 3.529 | 0.283 |
| 1.5 | 0.43 | 3.488 | 0.28 |

FIG. 3 to FIG. 6 shows a semi-submerged catamaran or an extended performance hydrofoil (EPH) in which the EMTs of the present invention are used for the propulsion system. As shown in FIG. 3, each EMT propulsion unit is mounted in a long, slender, submerged body. A fully-submerged foil 22 is mounted between two submerged bodies arranged by EMT propulsion units. Buoyant lift is combined with the dynamic lift of a fully-submerged foil 22 and the submerged body.

This foil 22 has a superconducting racetrack magnet 23 in itself and a pair of electrodes 24 are fixed on the upper surface of the foil. FIG. 6 shows the vector schematic of the forces acting upon the upper surface of the foil. The reaction between the magnetic field B (produced by fixing the superconducting racetrack magnet in the foil) and the electric current J from electrodes produces a Lorentz's force f' along the flow stream longitudinal axis of the foil 22. The sea water on the surface of the foil is accelerated by Lorentz's force. The flow velocity difference between the upper surface 22a and the under surface generates lifting force L by Bernoulli's law. The lifting force per unit length L is calculated by the following equation.

$$L = \rho U \Gamma = \rho U(U_u - U_d) \cdot 1 \quad (N/m)$$

where;
- σ: Sea water density (Kg/m³)
- U: Absolute ship velocity (m/s)
- Γ: Circulation (Total amount of maelstrom)
- Uu: Flow velocity upon the foil (m/s)
- Ud: Flow velocity under the foil (m/s)
- l: Overall length of the foil (m)

For example, TABLE 2 shows the relation between flow velocity difference and lifting force.

TABLE 2

| Velocity difference ΔU | 0.5 | 1 | 1.5 | 2 |
|---|---|---|---|---|
| lifting force L | $2 \times 10^3$ | $4 \times 10^3$ | $6 \times 10^3$ | $8 \times 10^3$ |

The basic principle of the hydrofoil concept is simply to lift a ship's hull out of the water and dynamically support it on wing-like hydrofoils in order to reduce the power required to attain modestly high speeds. As ship speed is increased, the lifting force generated by the water flow over the submerged portion of the foils increases causing the ship to rise and the submerged area of the foils to decrease. For a given speed the ship will rise until the lifting force equals the weight carried by the foils. The lifting force is dependent on ship speed. Prior art hydrofoils, in order to rise from water, require large output propulsion units. In hydrofoils powered by EMTs of the present invention, lifting force is controlled not only by ship speed but also by an electromagnetic force resulting in high thrust, reduction of hull weight and high ship speed.

Figure 7:
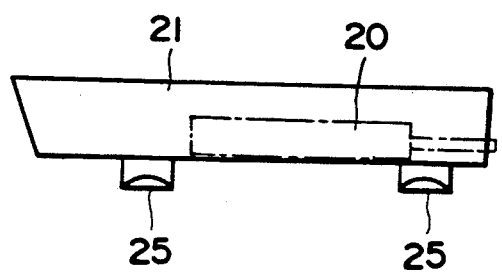
FIG. 7 shows a general layout illustration of EMTs mounted in the hull of a ship.
Figure 8:
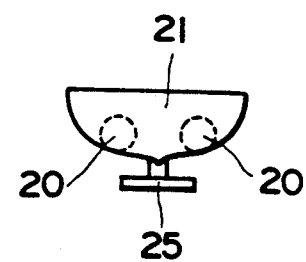
FIG. 8 shows a front view of FIG. 7.

FIG. 7 and FIG. 8 show two EMT propulsion units 20 mounted in parallel in the ship hull 21 to which a pair of EMT foils 25, 25 is connected.

The EMT foils system by the present invention is useful for the maneuver control of submarines.

In EMT hydrofoils, fundamental characteristics have been calculated as follows:

| (1) Specifications | |
| --- | --- |
| 1. Ship displacement | 200 metric tons |
| 2. Sailing speed | 45 knots |
| 3. EMT propulsion unit | Spiral type × 2 |
| (2) Weights | |
| 1. Hull | 80 tons |
| 2. Superconducting magnet | 30 × 2 = 60 tons |
| 3. Cryogenic systems | 5 tons |
| 4. Power generator | 25 tons |
| 5. Power supply systems | 15 tons |
| 6. The others | 15 tons |
| (3) Characteristics of elemental equipment | |
| 1. Superconducting magnets | |
| Type | solenoid type |
| Magnetic field | 10-12 Teslas |
| Length | 6 m |
| Diameter | 1.6 m |
| 2. Lifting devices | EMT foils shown in FIG. 4 |
| 3. Power generator | Fuel Cell or Gas turbine |
| 4. Electrodes | DSA |
| 5. Hull form | Semi-submerged Catamaran |
| 6. Power supply systems | Superconducting power electric circuit by conventional and high Tc superconducting materials |
| 7. Cryogenic systems | on board Helium refrigerator |

The calculated results based on the data are shown in TABLE 3. TABLE 3 shows the characteristics of a Boeing 922 Jetfoil that is the only commercial hydrofoil in the world. The EMT foil exhibited about two times the propulsive efficiency as a Boeing Jetfoil.

TABLE 3

|  | Boeing 922 Jetfoil | EMT foil by the present invention |
| --- | --- | --- |
| Length (m) | 27.43 | 25 |
| Breadth (m) | 8.53 | 10 |
| Depth (m) | 2.59 | 4 |
| Gross (ton) | 162 | 280 |
| Displacement (ton) | 119 | 200 |
| Power generator | Gas turbine | Gas turbine |
| Output of power generator (KW) | 5000 × 2 | 5000 × 2 |
| Propulsion system | waterjet propulsor × 2 | waterjet EMT × 2 |
| Thrust | 104 | 162 |
| Propulsive efficiency | 0.23 | 0.41 |
| Ship speed (Knot) | 45 | 45 |

The calculated results for large full-scale vessel shows the following.

| (1) Characteristics | |
| --- | --- |
| 1. Ship displacement | 5000 metric tons |
| 2. Sailing speed | 50 Knots |
| 3. EMT propulsion unit | Spiral type × 12 |
| (2) Weights | |
| 1. Hull | 2,000 tons |
| 2. Superconducting magnet | 100 × 12 = 1200 tons |
| 3. Cryogenic systems | 200 tons |
| 4. Power generator | 200 tons |
| 5. Power supply systems | 400 tons |
| 6. The others | 600 tons |
| (3) Characteristics of elemental equipment | |
| 1. Superconducting magnet | |
| Type | Solenoid |
| Magnetic field | 10-12 Teslas |
| Length | 15 m |
| Diameter | 5 m |
| 2. Lifting devices | EMT foils shown in FIG. 4 |
| 3. Power generator | Fuel Cell or Gas turbine |
| 4. Electrodes | DSA |
| 5. Hull form | Semi-submerged Catamaran |
| 6. Power supply systems | superconducting power electric circuit by conventional and high TC superconducting materials |
| 7. Cryogenic systems | on board Helium refrigerator |

Figure 9:
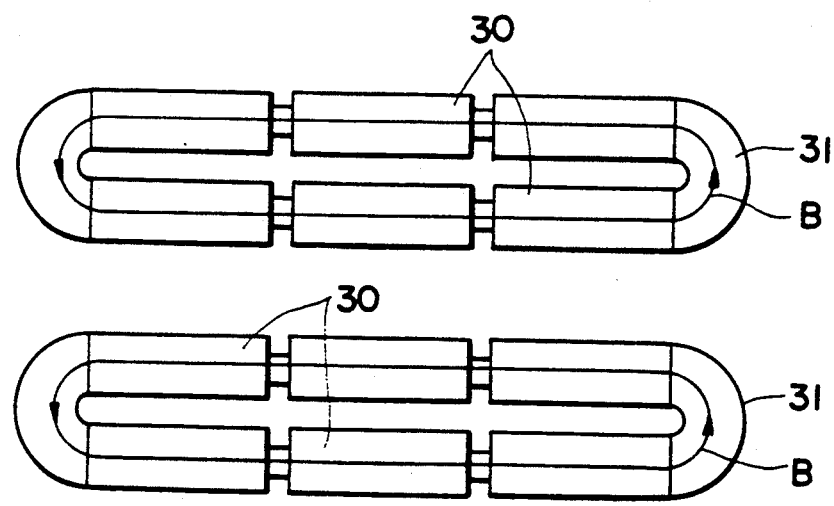
FIG. 9 shows a plan view of the arrangement of EMTs which provides a closed flux path.

Superconducting EMT propulsion units 30 can be arranged in four rows as shown in FIG. 9, wherein each pair of rows contains three pairs of ETM propulsion units 30. Superconducting shielding material devices 31 are mounted at both ends of each pair of rows of EMT propulsion units, forming a closed loop for the magnetic flux. As a result, the leakage of the magnetic field is negligible. The superconducting shielding device is made by plates, thin films and coils of high Tc superconducting material or conventional superconducting material.

INDUSTRIAL APPLICABILITY

The present invention is suitable for the ship propulsion system by generating thrust in the horizontal direction. Also, it is useful for DP Systems to produce the thrust in the horizontal and vertical directions. It is possible to be used as large sea water pumps, flowing sea water into fixed EMTs and discharging from the duct. Using the reverse principle of EMTs, it is possible to use ocean currents (MHD) for power generators.

I claim:

1. An electromagnetic thrust generator, comprising:
   a housing having a circular cylindrical interior surface defining an interior space extending through said housing, said space having a longitudinal center axis;
   a superconducting electrical coil arrangement disposed within said housing for generating a magnetic field within said space,
   a helical duct arranged coaxially within said space, said duct formed by:
      a circular cylindrical outer wall arranged opposite said interior surface of said housing,
      a circular cylindrical inner wall spaced radially inwardly of said outer wall, and
      intermediate walls interconnecting said outer and inner walls to form therewith a helical passage of substantially rectangular cross section and having a fluid inlet and a fluid outlet spaced longitudinally apart,
   a first electrode member mounted in said duct on an interior face of said inner wall; and
   a second electrode member mounted in said duct on an interior face of said outer wall and being of opposite polarity than said first electrode for creating an electrical field across said duct.

2. An electromagnetic thrust generator according to claim 1 wherein said interior of said outer wall defines an outer radius with respect to said axis, and said interior of said inner wall defines an inner radius with respect to said axis, a ratio of said outer radius to said inner radius being about 3.5.

3. An electromagnetic thrust generator according to claim 1 in combination with a sea-going vessel for propelling the vessel.

* * * * *